(12) United States Patent
Wen et al.

(10) Patent No.: US 9,215,741 B2
(45) Date of Patent: Dec. 15, 2015

(54) WIRELESS STATION, COMMUNICATION SYSTEM, AND COMMUNICATION METHOD

(71) Applicant: FUJITSU LIMITED, Kawasaki-shi, Kanagawa (JP)

(72) Inventors: Yun Wen, Kawasaki (JP); Hiroshi Fujita, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 190 days.

(21) Appl. No.: 13/849,277

(22) Filed: Mar. 22, 2013

(65) Prior Publication Data
US 2013/0229907 A1 Sep. 5, 2013

Related U.S. Application Data

(63) Continuation of application No. PCT/JP2010/067590, filed on Oct. 6, 2010.

(51) Int. Cl.
*H04W 76/02* (2009.01)
*H04L 1/18* (2006.01)
*H04W 74/08* (2009.01)
*H04W 84/18* (2009.01)
*H04L 1/00* (2006.01)
*H04W 76/04* (2009.01)

(52) U.S. Cl.
CPC ............. *H04W 76/027* (2013.01); *H04L 1/188* (2013.01); *H04W 74/08* (2013.01); *H04L 2001/0092* (2013.01); *H04W 76/048* (2013.01); *H04W 84/18* (2013.01)

(58) Field of Classification Search
CPC .......... G01S 3/02; G06F 15/16; H04M 11/04; H04W 24/00; H04W 40/00; H04W 76/027; H04W 84/02
See application file for complete search history.

(56) References Cited

U.S. PATENT DOCUMENTS

2002/0145564 A1* 10/2002 Stilp et al. .................... 342/457
2007/0223416 A1 9/2007 Baker et al.
(Continued)

FOREIGN PATENT DOCUMENTS

| CN | 1951057 A | 4/2007 |
|---|---|---|
| EP | 2 086 177 A1 | 8/2009 |
| JP | 2004-336210 A | 11/2004 |

(Continued)

OTHER PUBLICATIONS

Japanese Office Action issued in Application No. 2012-537520, mailed Jan. 7, 2014, 4 pages.

(Continued)

*Primary Examiner* — Andrew Lai
*Assistant Examiner* — Leon Andrews
(74) *Attorney, Agent, or Firm* — Arent Fox LLP

(57) ABSTRACT

A second wireless station includes a communicating unit that transmits a packet to a first wireless station and retransmits the packet when a response signal for the packet is not received by a predetermined response time limit; an acquiring unit that acquires from the first wireless station, transmission prohibition period information indicating a transmission prohibition period during which transmission of a signal by the first wireless station is prohibited; and a postponing unit that postpones the response time limit in the transmission prohibition period indicated by the acquired transmission prohibition period information to be after the transmission prohibition period ends.

10 Claims, 8 Drawing Sheets

(56) References Cited

U.S. PATENT DOCUMENTS

2010/0039969 A1     2/2010    Sukenari et al.
2011/0134895 A1*   6/2011    Sakaguchi et al. ............ 370/338

FOREIGN PATENT DOCUMENTS

| | | |
|---|---|---|
| JP | 2005/045616 A | 2/2005 |
| JP | 2008-283421 A | 11/2008 |
| JP | 2009-296215 A | 12/2009 |
| WO | WO 2005/109725 A1 | 11/2005 |
| WO | WO 2008/059678 A1 | 5/2008 |

OTHER PUBLICATIONS

International Search Report issued in PCT/JP2010/067590, mailed Dec. 28, 2010, 2 pages.

Chinese Office Action issued Mar. 20, 2015; Chinese Application No. 201080069440.2.

Chinese Office Action for Chinese Application No. 201080069440.2 dated Aug. 5, 2015.

* cited by examiner

FIG.4

| ADDRESS ID | NEXT HOP WIRELESS STATION | STARTING TIME OF TRANSMISSION PROHIBITION PERIOD | ENDING TIME OF TRANSMISSION PROHIBITION PERIOD |
|---|---|---|---|
| 5 | 2 | ts2 | te2 |
| 5 | 3 | ts3 | te3 |
| 5 | 4 | ts4 | te4 |
| ... | ... | ... | ... |

400

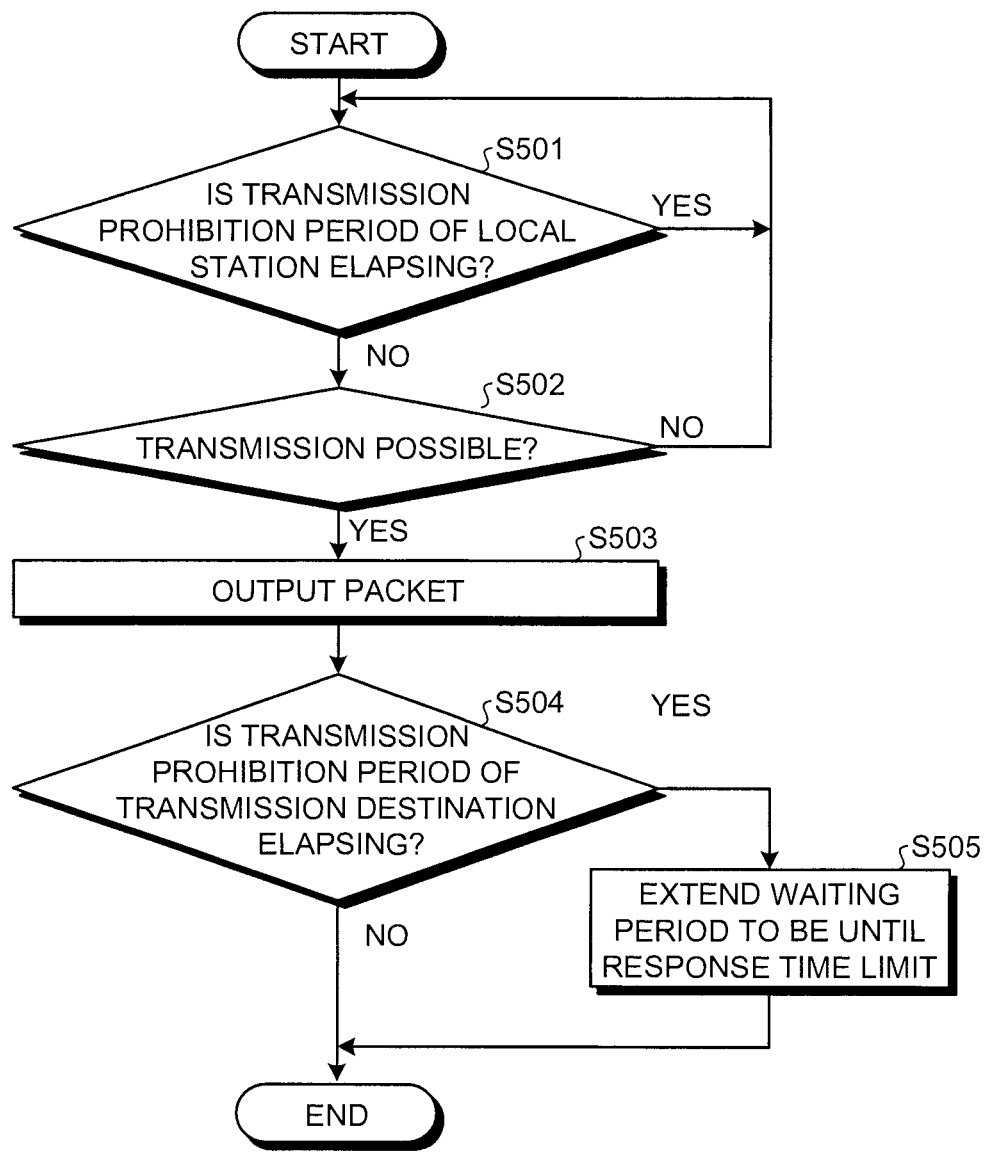

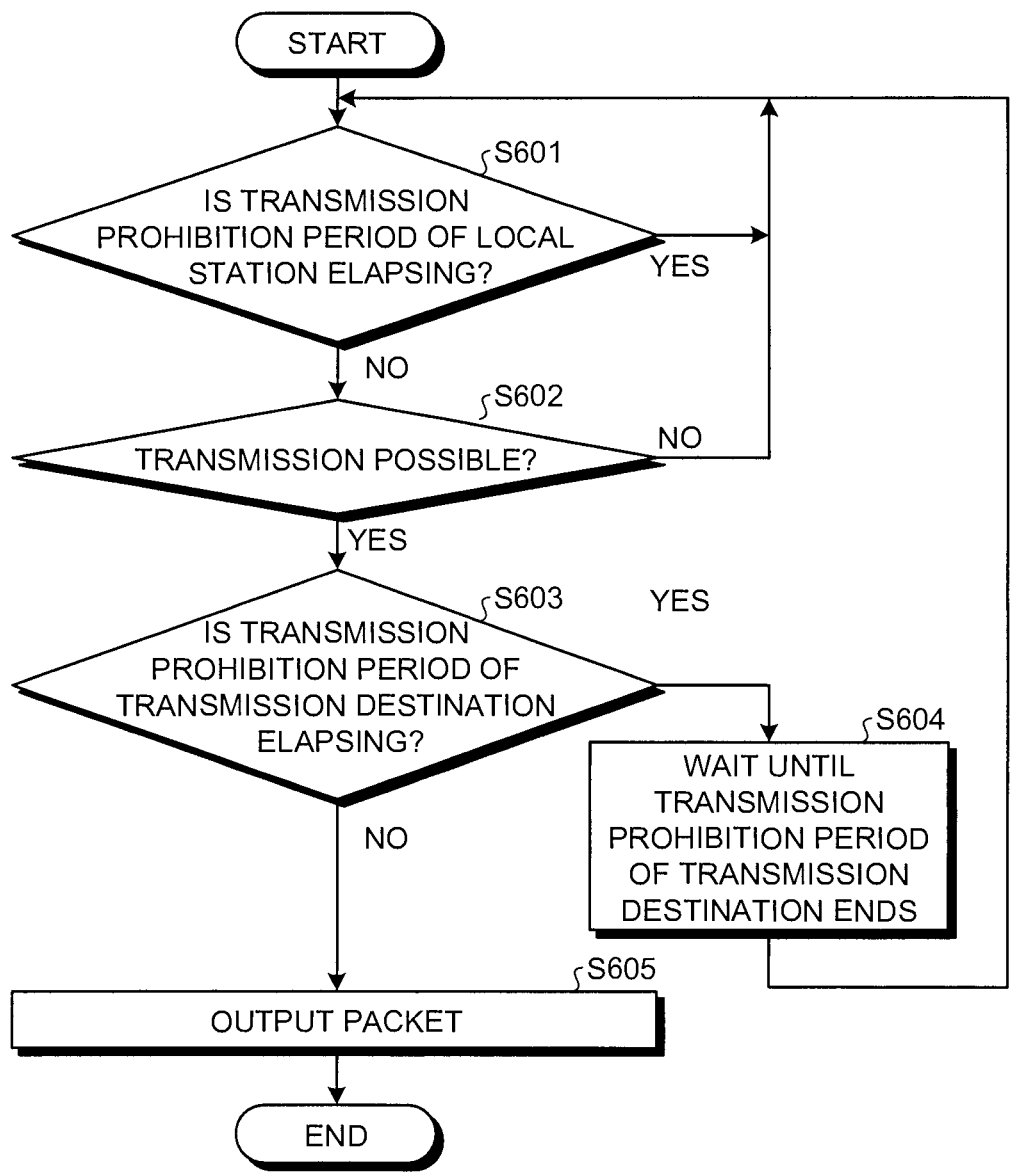

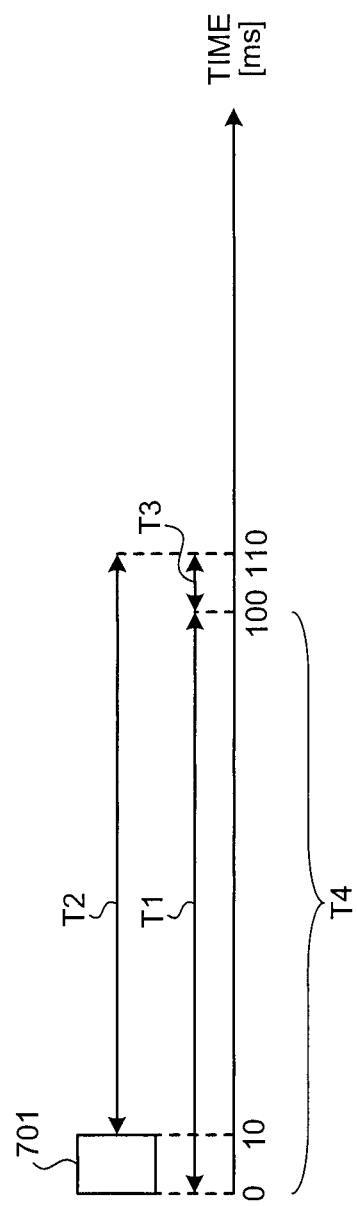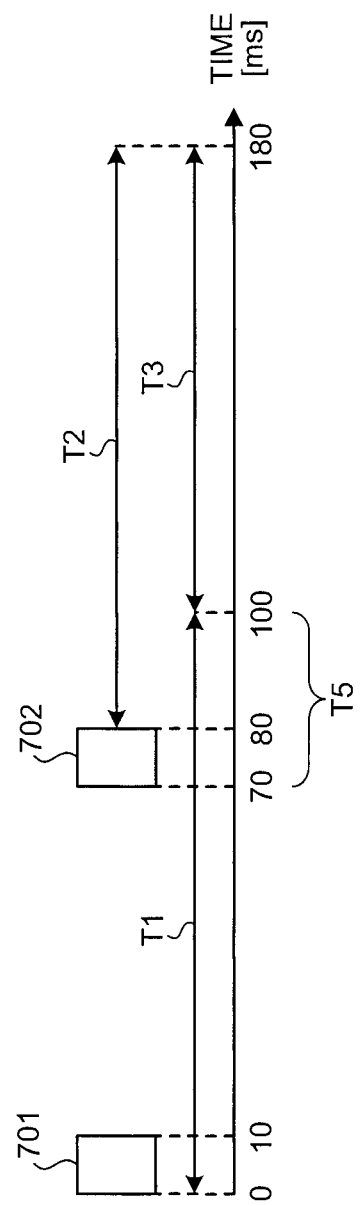

WIRELESS STATION, COMMUNICATION SYSTEM, AND COMMUNICATION METHOD

CROSS REFERENCE TO RELATED APPLICATIONS

This application is a continuation application of International Application PCT/JP2010/067590, filed on Oct. 6, 2010 and designating the U.S., the entire contents of which are incorporated herein by reference.

FIELD

The embodiments discussed herein are related to a wireless station, a communication system, and a communication method that perform wireless communication.

BACKGROUND

Recently, a wireless ad hoc network (self-configuring network) linking plural wireless stations by wireless communication is under investigation. In the wireless ad hoc network, a transmitting wireless station transmits a packet to a receiving wireless station and confirms the success of the transmission by receiving a response signal (Ack) transmitted from the receiving wireless station.

If no response signal has been received even after a given waiting period has elapsed, the transmitting wireless station judges the transmission to be unsuccessful and retransmits the packet. If an optimum pathway and an alternative pathway are present for one address, and no response signal is received even after the packet has been retransmitted a number of times to the wireless station via the optimum pathway, the transmitting wireless station switches the pathway and transmits the packet to the wireless station via the alternative pathway.

Depending on the radio wave frequency to be used (e.g., 950 [MHz] band), there is a legal regulation of setting a transmission prohibition period during which signal transmission is prohibited after the transmission by the wireless station. When each wireless station has an active period in which transmission/reception is possible and a sleep period in which the transmission/reception is not possible, a technology is known of synchronizing so that each wireless station will have an active period common with an adjacent wireless station (see, e.g., Japanese Laid-Open Patent Publication No. 2009-296215). The wireless stations perform synchronization, for example, by transmitting/receiving a synchronization packet periodically.

In the wireless ad hoc network, since the transmitting timings of the wireless stations are asynchronous and the transmission prohibition periods of the wireless stations are also asynchronous, a packet may be transmitted to a wireless station during the transmission prohibition period. In this case, even if the packet is successfully received, the receiving wireless station cannot transmit a response signal and as a result, the transmitting wireless station retransmits the properly received data. Consequently, a problem arises in that traffic increases and throughput of the network decreases.

With the technology of synchronizing wireless stations by periodic transmission of synchronization packets, a problem arises in that the synchronization packets increase traffic and lower network throughput. Since the transmission prohibition period is set so that the wireless stations will synchronize with each other, the transmission prohibition period becomes longer than regulated, resulting in a delay in the transmission of the packet and lowered throughput.

SUMMARY

According to an aspect of an embodiment, a second wireless station includes a communicating unit that transmits a packet to a first wireless station and retransmits the packet when a response signal for the packet is not received by a predetermined response time limit; an acquiring unit that acquires from the first wireless station, transmission prohibition period information indicating a transmission prohibition period during which transmission of a signal by the first wireless station is prohibited; and a postponing unit that postpones the response time limit in the transmission prohibition period indicated by the acquired transmission prohibition period information to be after the transmission prohibition period ends.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts one example of pathway information;

FIG. 5 is a flowchart of a processing example of a transmission control unit according to the first embodiment;

FIG. 6 is a flowchart of a processing example of the transmission control unit according to a second embodiment;

FIG. 7A depicts a first setting example of a transmission prohibition period;

FIG. 7B depicts a second setting example of the transmission prohibition period;

DESCRIPTION OF EMBODIMENTS

Preferred embodiments will be described in detail with reference to the accompanying drawings.

Figure 1:
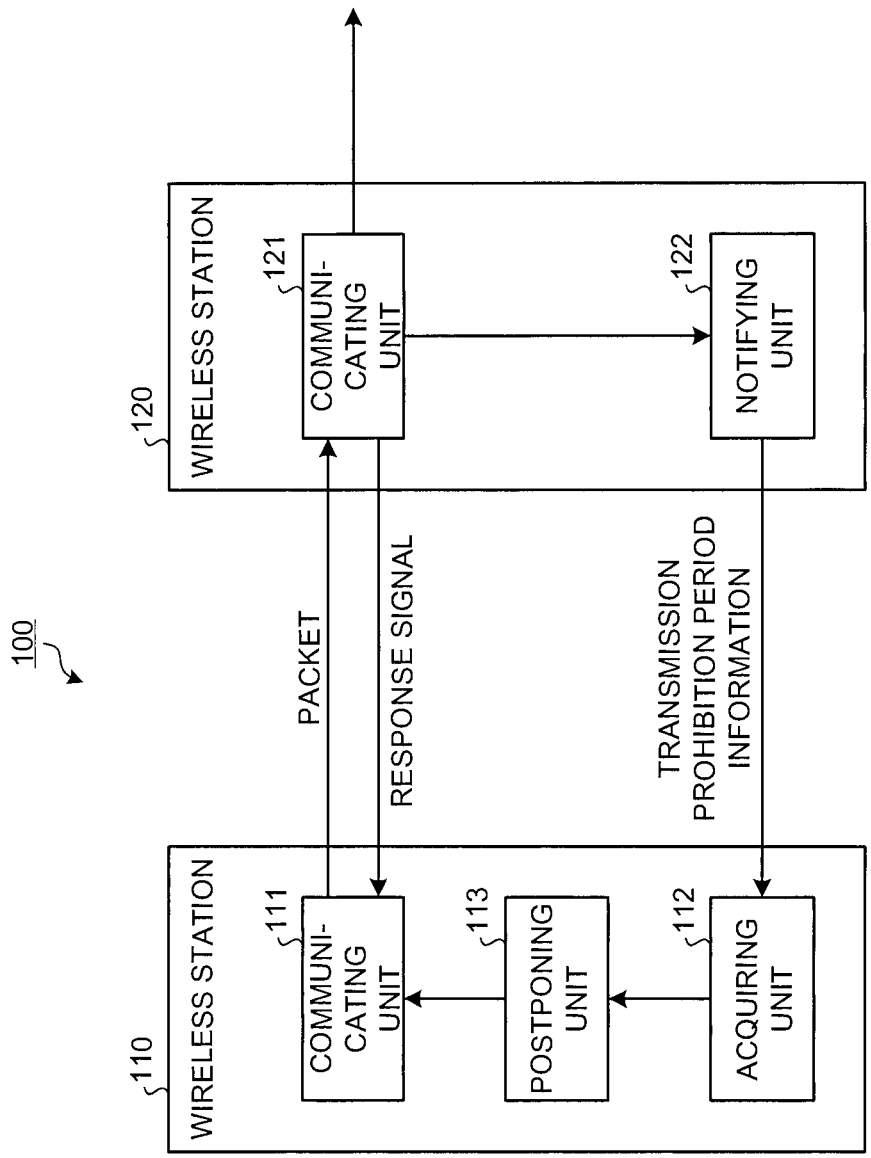
FIG. 1 depicts a communication system according to a first embodiment.

FIG. 1 depicts a communication system according to a first embodiment. A communication system 100 depicted in FIG. includes a wireless station 110 (second wireless station) and a wireless station 120 (first wireless station). The wireless station 110 and the wireless station 120 are respectively communication devices that perform wireless communication. Mainly, a configuration will be described for transmitting a packet from the wireless station 110 to the wireless station 120. The wireless station 110 has a communicating unit 111, an acquiring unit 112, and a postponing unit 113.

The communicating unit 111 transmits a packet to the wireless station 120 (other wireless station). The communicating unit 111 retransmits the packet if the communicating unit 111 does not receive from the wireless station 120 and within a predetermined response time limit, a response signal (Ack) in response to the packet transmitted to the wireless station 120. For example, the communicating unit 111 sets a period from the transmission of the packet until the time at which a given waiting period ends as a response period.

Retransmission of the packet is, for example, the retransmission to the wireless station 120 to which the packet was transmitted. When there is a packet transmission pathway other than that to the wireless station 120, the packet may be retransmitted to the other transmission pathway.

The acquiring unit 112 acquires from the wireless station 120, a transmission prohibition period during which signal transmission by the wireless station 120 is prohibited. For example, the acquiring unit 112 acquires from the wireless station 120, transmission prohibition period information directly or indirectly indicating the transmission prohibition period of the wireless station 120. The acquiring unit 112 notifies the postponing unit 113 of the transmission prohibition period indicated by the acquired transmission prohibition period information.

The postponing unit 113 postpones the response time limit of the communicating unit 111 in the transmission prohibition period notified by the acquiring unit 112 to be after the end of the transmission prohibition period. For example, if a request to transmit the packet at the communicating unit 111 occurs during the transmission prohibition period of the wireless station 120, the postponing unit 113 postpones the response time limit of the communicating unit 111 to be after the end of the transmission prohibition period.

For example, the communicating unit 111 transmits the packet even during the transmission prohibition period of the wireless station 120 and the postponing unit 113 extends the waiting period from the transmission of the packet by the communicating unit 111 until the response time limit, thereby making it possible to postpone the response time limit of the communicating unit 111 to be after the end of the transmission prohibition period. Transmission of the packet during the transmission prohibition period of the wireless station 120 enables the packet to be transmitted efficiently. Consequently, a situation can be prevented in which, for example, at the time when the transmission prohibition period of the wireless station 120 ends, the transmission prohibition period of the wireless station 110 begins and the packet cannot be transmitted from the wireless station 110.

The wireless station 120 has a communicating unit 121 and a notifying unit 122. The communicating unit 121 transmits to the wireless station 110 (other wireless station) the response signal to the packet received from the wireless station 110. The communicating unit 121 also transmits the packet from the wireless station 120 (local station) to other wireless stations. A transmission destination of the packet from the wireless station 120 may be the wireless station 110 or a wireless station different from the wireless station 110.

In the case of transmission of the packet to another wireless station, the communicating unit 121 sets the transmission prohibition period during which signal transmission by the wireless station 120 is prohibited. The communicating unit 121 does not transmit the packet to other wireless stations during the set transmission prohibition period. In the case of reception of a packet from the wireless station 110 during the set transmission prohibition period, the communication unit 121 transmits a response signal to the wireless station 110 when the transmission prohibition period ends.

The communicating unit 121 notifies the notifying unit 122 of the set transmission prohibition period. The notifying unit 122 notifies the wireless stations around the wireless station 120 of the transmission prohibition period notified by the communicating unit 121. For example, the notifying unit 122 distributes transmission prohibition period information that directly or indirectly indicates the transmission prohibition period. The wireless stations around the wireless station 120 are wireless stations capable of performing direct wireless communication with the wireless station 120, including the wireless station 110.

For example, the notifying unit 122 gives notification of the transmission prohibition period, which is set consequent to packet transmission by the wireless station 120, concurrently with the transmission of a packet from the wireless station 120. Thus, before the start of the transmission prohibition period, it is possible to assuredly give notification of the transmission prohibition period, which is set consequent to packet transmission.

The notifying unit 122 may given notification of the transmission prohibition period by way of the communicating unit 121. For example, the notifying unit 122 may store the transmission prohibition period information in a packet from the wireless station 120 to be transmitted by the communicating unit 121. Thereby making it possible to give notification of the transmission prohibition period to the wireless station that is the transmission destination of the packet to be transmitted from the communicating unit 121. Notification of the transmission prohibition period can be given to wireless stations other than the transmission destination of the packet to be transmitted from the communicating unit 121 by having the packet to be transmitted from the communicating unit 121 monitored by the wireless stations.

Since notification of the transmission prohibition period can be given without generating a new packet to transmit the transmission prohibition period information, increases in the traffic can be suppressed. Thus, a situation in which the transmission prohibition period of the wireless station 120 is caused to occur more often or is extended by the transmission of a new packet for giving notification of the transmission prohibition period can be prevented.

The notifying unit 122 may store the transmission prohibition period information into a header portion of the packet to be transmitted from the communication unit 121, whereby the transmission prohibition period information can be obtained by reading merely the header portion of the packet without decoding a data portion and as a result, wireless stations other than the transmission destination of the packet can easily acquire the transmission prohibition period information.

Figure 2:
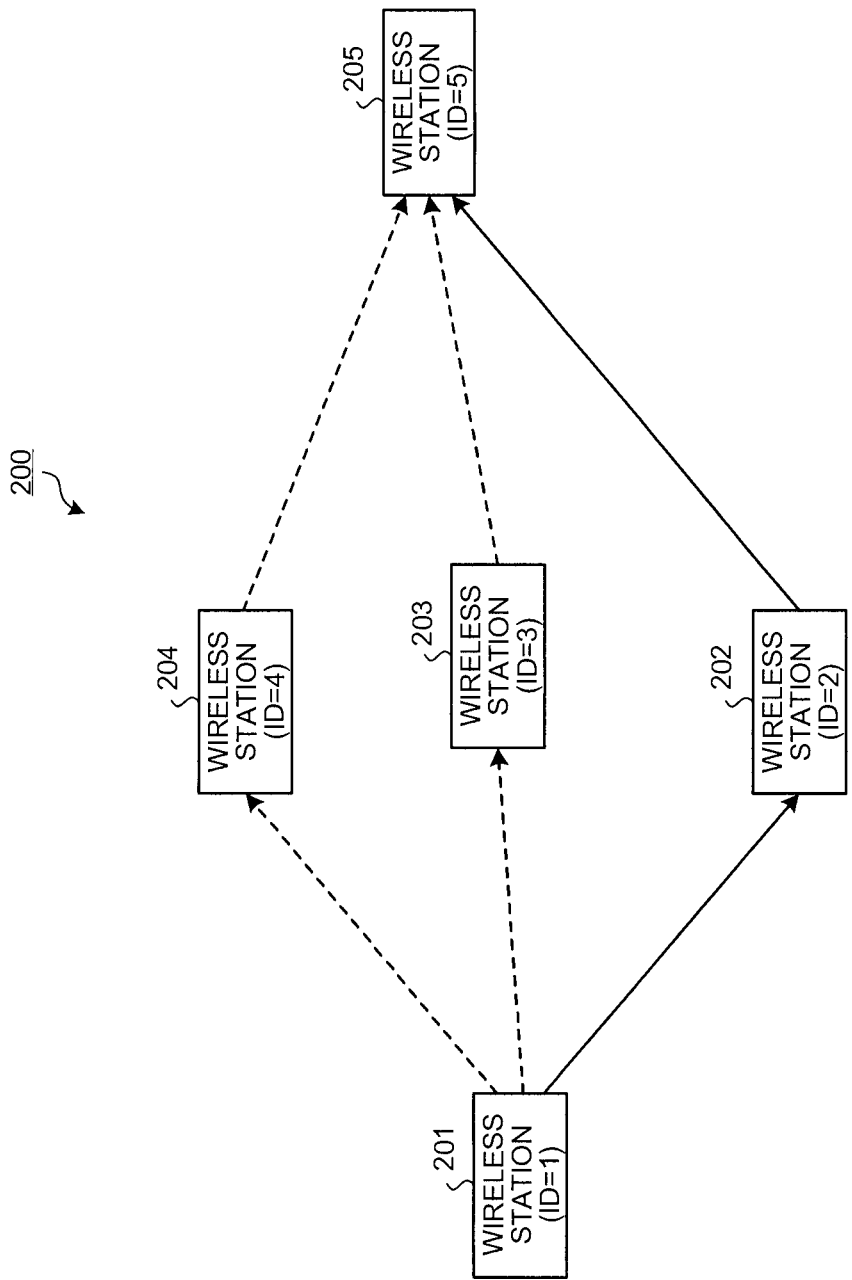
FIG. 2 depicts one example of the communication system.

FIG. 2 depicts one example of the communication system. As depicted in FIG. 2, a communication system 200 includes wireless stations 201 to 205 and is an independent and distributed wireless network (ad hoc network), where the wireless stations 201 to 205 are interlinked by the wireless communication. Each of the wireless stations 201 to 205 is a wireless station capable of the wireless communication. The wireless stations 201 to 205 are given IDs of "1" to "5", respectively.

For example, when the wireless station 201 transmits a packet addressed to the wireless station 205, it is assumed that there are three pathways through the wireless stations 202 to 204. The wireless station 201 transmits to any of the wireless stations 202 to 204, a packet addressed to the wireless station 205. The wireless station that receives the packet addressed to the wireless station 205 from the wireless station 201, among the wireless stations 202 to 204, transfers the received packet to the wireless station 205.

In each link among the wireless stations 201 to 205, a retransmission control is performed by which the packet is transmitted again, when no response signal is received even after the response time limit subsequent to a given period after the transmission of the packet. Retransmission control of the packet includes retransmission control by transmitting the packet again to the wireless station to which the packet was transmitted and retransmission control by transmitting (pathway switching) the packet again to a pathway different from the wireless station to which the packet was transmitted.

The communication system 100 depicted in FIG. 1 can be applied to each link among the wireless stations 201 to 205. For example, each of the wireless stations 201 to 205 has the function of the wireless station 110 and the wireless station 120. For example, the wireless station 202 notifies surrounding wireless stations (e.g., wireless stations 201, 203, 205, etc.) of the transmission prohibition period of the wireless station 202. The wireless station 201, in transmitting the packet to the wireless station 202, postpones the response time limit in the transmission prohibition period of the wireless station 202 notified by the wireless station 202 to be after the end of the transmission prohibition period.

Thus, the wireless station 201 can be prevented from performing the retransmission control because of an inability of the wireless station 202 to transmit a signal in response to the packet from the wireless station 201 due to the transmission prohibition period. For example, a situation can be prevented in which the packet is transmitted again from the wireless station 201 to the wireless station 202 or the packet is retransmitted (pathway switched) from the wireless station 201 to the wireless station 203 or the wireless station 204 so that the packet is transmitted by plural pathways.

Figure 3:
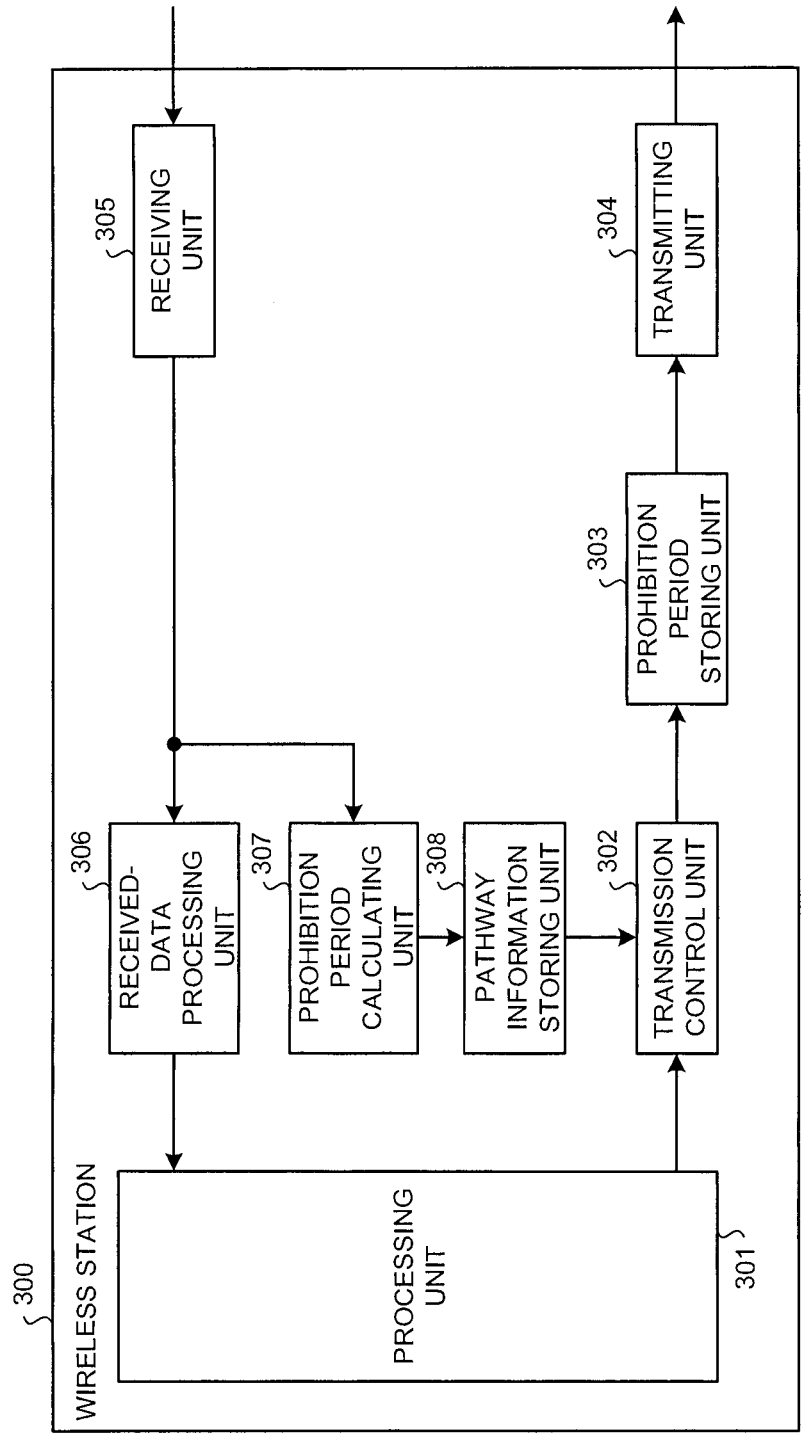
FIG. 3 depicts one example of a wireless station.

FIG. 3 depicts one example of the wireless station. A wireless station 300 is, for example, a wireless station applicable to each of the wireless stations 201 to 205 depicted in FIG. 2. The wireless station 300 is a wireless station having the functions of the wireless station 110 and the wireless station 120 depicted in FIG. 1. The wireless station 300 has a processing unit 301, a transmission control unit 302, a prohibition period storing unit 303, a transmitting unit 304, a receiving unit 305, a received-data processing unit 306, a prohibition period calculating unit 307, and a pathway information storing unit 308.

The communicating unit 111 of FIG. 1 can be realized by the processing unit 301, the transmission control unit 302, the transmitting unit 304, the receiving unit 305, and the received-data processing unit 306. The acquiring unit 112 of FIG. 1 can be realized by the receiving unit 305 and the prohibition period calculating unit 307. The postponing unit 113 of FIG. 1 can be realized by the transmission control unit 302 and the pathway information storing unit 308. The communicating unit 121 of FIG. 1 can be realized by the processing unit 301, the transmission control unit 302, the transmitting unit 304, the receiving unit 305, and the received-data processing unit 306. The notifying unit 122 of FIG. 1 can be realized by the prohibition period storing unit 303 and the transmitting unit 304.

The processing unit 301 generates data to be transmitted from the wireless station 300 (local station) to other wireless stations and outputs the generated data to the transmission control unit 302. The processing unit 301 also processes the data output from the received-data processing unit 306. For example, the processing unit 301 generates a response signal (Ack) for the data output from the received-data processing unit 306 and outputs the response signal (Ack) to the transmission control unit 302. The processing unit also transfers data having another station as a final address by outputting the data to the transmission control unit 302.

The transmission control unit 302 performs transmission control of the data (including response signals) output from the processing unit 301, based on the pathway information stored in the pathway information storing unit 308. For example, the transmission control unit 302 acquires from the pathway information of the pathway information storing unit 308, the next hop wireless station ID associated with an ID indicating the address of the data output from the processing unit 301. The transmission control unit 302 generates a packet storing a header portion including the acquired next hop wireless station ID as a transmission destination and the data output from the processing unit 301.

The transmission control unit 302 acquires from the pathway information of the pathway information storing unit 308, the transmission prohibition period of the acquired next hop destination. The transmission control unit 302, based on the acquired transmission prohibition period, postpones the response time limit for waiting for a signal in response to the generated packet. The transmission control unit 302 outputs the generated packet to the prohibition period storing unit 303, whereby the packet output by the transmission control unit 302 is transmitted from the transmitting unit 304.

After transmission of the packet, the transmission control unit 302 sets the transmission prohibition period during which the transmission of the packet from the wireless station 300 is prohibited. The packet based on the data output from the processing unit 301 during the transmission prohibition period is output by the transmission control unit 302 to the prohibition period storing unit 303 upon ending of the transmission prohibition period.

The prohibition period storing unit 303 stores the transmission prohibition period information indicating the transmission prohibition period of the wireless station 300 into the header portion of the packet output from the transmission control unit 302. The prohibition period storing unit 303 outputs to the transmitting unit 304, the packet storing the transmission prohibition period information. The transmitting unit 304 performs wireless transmission of the packet output from the prohibition period storing unit 303.

The receiving unit 305 receives packets transmitted from wireless stations surrounding the wireless station 300. The receiving unit 305 outputs the received packets to the received-data processing unit 306 and the prohibition period calculating unit 307. The received-data processing unit 306 acquires the transmission destination of the packet, included in the header portion of the packet output from the receiving unit 305. The received-data processing unit 306 discards packets having another station as a transmission destination as well as outputs to the processing unit 301, the data stored in packets having the local station as a transmission destination.

The prohibition period calculating unit 307 acquires transmission prohibition period information included in the header portion of the packets output from the receiving unit 305. This enables the prohibition period calculating unit 307 to acquire the transmission prohibition period information stored in the packet having the local station as a transmission destination as well as monitor the transmission prohibition period information stored in packets having another station as a transmission destination. The prohibition period calculating unit 307 calculates the transmission prohibition period of the transmission source of the packet, based on the acquired transmission prohibition period information. The prohibition period calculating unit 307 registers into the pathway information of the pathway information storing unit 308, the calculated transmission prohibition period, in association with the wireless station as the transmission source of the packet.

The pathway information storing unit 308 stores the pathway information associating the address of the packet with the next hop destination (transmission destination). The pathway information stored in the pathway information storing unit 308 is sequentially updated depending on the wireless stations present around the wireless station 300. Updating of the pathway information is performed, for example, by the processing unit 301. In the pathway information to be stored to the pathway information storing unit 308, the next hop destination of each hop destination and the transmission prohibition period set for the next hop destination are associated.

FIG. 4 depicts one example of the pathway information. A table 400 depicted in FIG. 4 denotes an example of the pathway information to be stored to the pathway information storing unit 308 of the wireless station 201 depicted in FIG. 2. The table 400 indicates the pathways having the wireless station 205 (ID=5) as the address. For example, for the wireless station 201, there are three pathways having the wireless station 205 as the address and the next hop wireless station IDs of these pathways are "2", "3", and "4".

Therefore, when data having the wireless station 205 (ID-5) as the address is output from the processing unit 301, the transmission control unit 302 determines any one of the wireless stations 202 to 204 as the transmission destination. In the table 400, each next hop wireless station ID is associated with a starting time and an ending time of the transmission prohibition period. This enables the transmission control unit 302 to acquire the transmission prohibition period of the wireless station that is the transmission destination of the data.

FIG. 5 is a flowchart of a processing example of the transmission control unit according to the first embodiment. Upon output of the data from the processing unit 301, the transmission control unit 302 executes operations, for example, depicted in FIG. 5. The transmission control unit 302 first determines whether the transmission prohibition period of the local station is elapsing (step S501). If the transmission prohibition period of the local station is elapsing (step S501: YES), the transmission control unit 302 waits for the transmission prohibition period to end. If the transmission prohibition period of the local station has elapsed (step S501: NO), the transmission control unit 302 confirms slot availability of the local station and determines whether a packet including the data output from the processing unit 301 can be transmitted (step S502).

At step S502, if the packet cannot be transmitted (step S502: NO), the flow returns to step S501. If the packet including the data output from the processing unit 301 can be transmitted (step S502: YES), the transmission control unit 302 outputs the packet to the prohibition period storing unit 303 (step S503). Consequently, the prohibition period storing unit 303 stores the transmission prohibition period information of the local station into the header portion of the packet and the transmitting unit 304 transmits the packet.

The transmission control unit 302 determines whether the transmission prohibition period of the transmission destination (next hop destination) of the packet transmitted at step S503 is elapsing (step S504). If the transmission prohibition period of the transmission destination has elapsed (step S504: NO), the transmission control unit 302 ends the series of operations. If the transmission prohibition period is elapsing the transmission destination (step S504: YES), the transmission control unit 302 extends the waiting period from the transmission of the packet at step S503 until the response time limit (step S505), and end the series of operations. Thus, the response time limit of the packet transmitted at step S503 is postponed.

The operations above enable the transmission of a packet to a transmission destination even during the transmission prohibition period of the transmission destination as well as the postponement of the response time limit by extending the waiting period, from the transmission of the packet until the response time limit.

At step S505, configuration may be such that if the ending time of the transmission prohibition period is later than the response time limit, the response time limit will be postponed and that if the ending time of the transmission prohibition period is earlier than the response time limit, the response time limit will not be postponed. If the response time limit is not postponed when the ending time of the transmission prohibition period is earlier than the response time limit, unnecessary postponing of the response time limit can be prevented. For example, if a response signal is not transmitted because of the transmitting destination not properly receiving the packet transmitted at step S503, a case of waiting for the response signal beyond the original response time limit can be prevented.

Thus, in the communication system 100 according to the first embodiment, the wireless station 120 notifies the wireless station 110 of the transmission prohibition period of the wireless station 120. The wireless station 110 transmits packets to the wireless station 120 even during the transmission prohibition period of the wireless station 120 as well as postpones the response time limit by extending the waiting period, from the transmission of the packet by the wireless station 110 until the response time limit. As a result, retransmission of a properly received packet from the second wireless station can be prevented, improving the throughput of the network.

The communication system according to a second embodiment is identical to the communication system 100 depicted in FIG. 1, except that when a request to transmit a packet at the communicating unit 111 occurs during the transmission prohibition period of the wireless station 120, the postponing unit 113 of the wireless station 110 delays the transmission of the packet by the communicating unit 111. Since this delays the starting point of the response time limit to be set for the communicating unit 111, the response time limit of the communicating unit 111 can be postponed.

The postponing unit 113 may cause the transmission of the packet by the communication unit 111 to be postponed until after the transmission prohibition period of the wireless station 120 ends. Thus, the response time limit can be assuredly postponed to be after the ending of the transmission prohibition period of the wireless station 120.

Examples of the communication system, the wireless station, and the pathway information according to the second embodiment are identical to the examples depicted in FIGS. 1 to 4. A processing example of the transmission control unit 302 of the wireless station 300 according to the second embodiment will be described.

FIG. 6 is a flowchart of a processing example of the transmission control unit according to the second embodiment. Upon output of the data from the processing unit 301, the transmission control unit 302 executes, for example, operations depicted in FIG. 6. The transmission control unit 302 determines whether the transmission prohibition period of the local station is elapsing (step S601). If the transmission prohibition period is elapsing (step S601: YES), the transmission control unit 302 executes step S601 again. If the transmission prohibition period has elapsed (step S601: NO), the transmission control unit 302 confirms slot availability of the local station and determines whether a packet including the data output from the processing unit 301 can be transmitted (step S602).

At step S602, if the packet cannot be transmitted (step S602: NO), the flow returns to step S601. If the packet can be transmitted (step S602: YES), the transmission control unit 302 determines whether the transmission prohibition period of the transmission destination (next hop destination) of the packet is elapsing (step S603). If the transmission prohibition period of the transmission destination is elapsing (step S603:

YES), the transmission control unit 302 waits until the transmission prohibition period of the transmission destination ends (step S604) and returns to step S601.

At step S603, if the transmission prohibition period of the transmission destination has elapsed (step S603: NO), the transmission control unit 302 outputs the packet to the prohibition period storing unit 303 (step S605), ending the series of operations. Thus, the prohibition period storing unit 303 stores the transmission prohibition period information of the local station into the header portion of the packet and the transmitting unit 304 transmits the packet. If the transmission prohibition period of the transmission destination of the packet is elapsing, the operations above enable the response time limit to be postponed by delaying the transmission of the packet until the end of the transmission prohibition period.

At steps S603 and S604, configuration may be such that if the ending time of the transmission prohibition period is later than the response time limit, the response time limit is postponed and that if the ending time of the transmission prohibition period is earlier than the response time limit, the response time limit is not postponed. If the response time limit is not postponed when the ending time of the transmission prohibition period is earlier than the response time limit, unnecessary postponing of the response time limit can be prevented.

Thus, in the communication system 100 according to the second embodiment, the wireless station 120 notifies the wireless station 110 of the transmission prohibition period of the wireless station 120. When a request to transmit a packet at the communicating unit 111 occurs in the transmission prohibition period of the wireless station 120, the wireless station 110 postpones the response time limit of the communicating unit 111 by delaying the transmission of the packet by the communicating unit 111. Thus, retransmission of a properly received packet from the second wireless station can be prevented, improving the throughput of the network.

Setting of the transmission prohibition period in for embodiment will be described.

FIG. 7A depicts a first setting example of the transmission prohibition period. FIGS. 7A and 7B depict setting methods of the transmission prohibition period prescribed by regulations for 950 [MHz] band as one example. In FIGS. 7A and 7B, the horizontal axis represents time [ms].

A packet 701 is a first packet that the wireless station 300 transmits after startup or after the transmission prohibition period has ended. The transmission start time of the packet 701 is given as 0 [ms], the packet length (time required for transmission) of the packet 701 as 10 [ms]. Therefore, the transmission end time of the packet 701 is time 10 [ms].

As depicted in FIG. 7A, the wireless station 300 sets a continuously transmittable period T1 of a given length (given as 100 [ms]) from the transmission starting time (time 0 [ms]) of the packet 701. The wireless station 300 sets a dormant period T2 of a given length (given as 100 [ms]) from the transmission ending time (time 10 [ms]) of the packet 701. If the wireless station 300 does not transmit a new packet during the dormant period T2, the wireless station 300 can transmit the new packet after the dormant period T2 ends.

A transmission prohibition period T3 during which the wireless station 300 is prohibited from transmitting a signal is from the ending time (time 100 [ms]) of the continuously transmittable period T1 to the ending time (time 110 [ms]) of the dormant period T2. At the time of transmitting the packet 701, the wireless station 300 calculates time T4 from the transmission starting time (time 0 [ms]) of the packet 701 until time 100 [ms] when the continuously transmittable period T1 ends, as the transmission prohibition period information of the local station. In this case, time T4 is information that indirectly indicates the transmission prohibition period of the wireless station 300.

In this example, time T4=100 [ms]−0 [ms]=100 [ms] is calculated as the transmission prohibition period information. The prohibition period storing unit 303 stores the calculated transmission prohibition period information into the packet 701 and transmits the packet 701. This enables surrounding wireless stations that receive the packet 701 to calculate the transmission prohibition period T3 of the wireless station 300 based on the transmission prohibition period information (time T4) included in the received packet 701.

FIG. 7B depicts a second setting example of the transmission prohibition period. As depicted in FIG. 7B, when there is a data transmission request during the continuously transmittable period T1 depicted in FIG. 7A, the wireless station 300 can transmit a new packet 702 even during the dormant period T2. The transmission starting time of the packet 702 is given as time 70 [ms], the packet length of the packet 702 as 10 [ms]. Therefore, the transmission ending time of the packet 702 is time 80 [ms]. In this case, since a new dormant period T2 is set from time 80 [ms] when the transmission of the packet 702 ends, the transmission prohibition period T3 is extended.

At the time of transmitting the packet 702, the wireless station 300 calculates time T5 from the transmission starting time (time 70 [ms]) of the packet 702 until time 100 [ms] at which the continuously transmittable period T1 ends, as the transmission prohibition period information of the local station. In this case, time T5=100 [ms]−70 [ms]=30 [ms] is calculated as the transmission prohibition period information.

The prohibition period storing unit 303 stores the calculated transmission prohibition period information into the packet 702 and transmits the packet 702. This enables surrounding stations that receive the packet 702 to calculate the transmission prohibition period T3 of the wireless station 300, based on the transmission prohibition period information (time T5) included in the received packet 702.

Figure 8A:
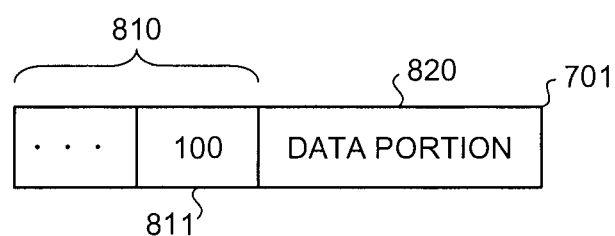
FIG. 8A depicts one example of transmission prohibition period information to be transmitted by first setting example.

FIG. 8A depicts one example of the transmission prohibition period information to be transmitted by first setting example. The packet 701 depicted in FIG. 8A is the packet 701 depicted in FIG. 7A. As depicted in FIG. 8A, the packet 701 includes a header portion 810 and a data portion 820. The wireless station 300 stores into the header portion 810 as the transmission prohibition period information of the local station, transmission prohibition period information 811 indicating the calculated time T4=100 [ms].

Each wireless station that is around the wireless station 300 and receives the packet 701 reads out the header portion 810 of the received packet 701 and calculates the transmission prohibition period T3 of the wireless station 300, based on the time T4 indicated by the transmission prohibition period information 811 stored in the header portion 810. It is assumed that the dormant period length (100 [ms]) is common to all wireless stations.

The starting time (time 100 [ms]) of the transmission prohibition period T3 is calculated by packet 701 reception ending time+(time T4−packet length)=10 [ms]+(100 [ms]−10 [ms]). The ending time (time 110 [ms]) of the transmission prohibition period T3 is calculated by packet 701 reception ending time+dormant period length=10 [ms]+100 [ms].

Figure 8B:
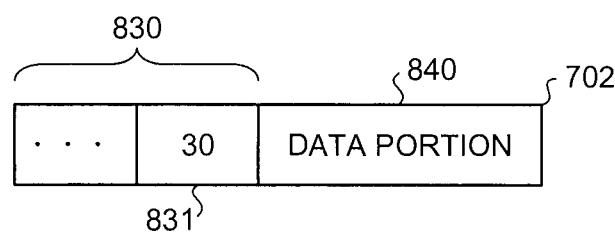
FIG. 8B depicts one example of the transmission prohibition period information to be transmitted by second setting example.

FIG. 8B depicts one example of the transmission prohibition period information to be transmitted by second setting example. The packet 702 depicted in FIG. 8B is the packet 702 depicted in FIG. 7B. As depicted in FIG. 8B, the packet 702 includes a header portion 830 and a data portion 840. The wireless station 300 stores into the header portion 830 as the transmission prohibition period information of the local station, transmission prohibition period information 831 indicating the calculated time T5=30 [ms].

Each wireless station that is around the wireless station 300 and receives the packet 702 reads out the header portion 830 of the received packet 702 and calculates the transmission prohibition period T3 of the wireless station 300 based on the time T5 indicated by the transmission prohibition period information 831 stored in the header portion 830. It is assumed that the dormant period length (100 [ms]) is common to all wireless stations.

The starting time (time 100 [ms]) of the transmission prohibition period T3 is calculated by packet 702 reception ending time+(time T5−packet length)=80 [ms]+(30 [ms]−10 [ms]). The ending time (time 180 [ms]) of the transmission prohibition period T3 is calculated by packet 702 reception ending time+dormant period length=80 [ms]+100 [ms].

Thus, the wireless station 300 can distribute transmission prohibition period information that indirectly indicates the transmission prohibition period by taking the information (time T4/T5) indicating a relationship of transmitting timing of the packet storing the transmission prohibition period information and the transmission prohibition period as the transmission prohibition period information. A wireless station that receives the packet storing the transmission prohibition period information can calculate the transmission prohibition period of the wireless station 300, based on the packet receiving timing and time T4/T5. Thus, wireless stations can share the transmission prohibition period with each other even if the wireless stations are asynchronous as in an ad hoc network.

As described, according to the disclosed wireless station, communication system, and communication method, the wireless station 110 can be notified of the transmission prohibition period of the wireless station 120 and the response time limit of the wireless station 110 during the transmission prohibition period of the wireless station 120 can be postponed to be after the transmission prohibition period ends. Thus, the retransmission of a properly received packet from the wireless station 110 can be prevented, improving the throughput of the network.

Since the response time limit is dynamically postponed according to the transmission prohibition period, it is unnecessary to set the transmission prohibition period so that the wireless stations will synchronize with each other and lengthening of the transmission prohibition period beyond regulatory requirements can be prevented, thereby further improving the throughput of the network.

The disclosed wireless station, communication system, and communication method enable improved network throughput.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A second wireless station comprising:
a communicating unit configured to transmit a packet to a first wireless station and retransmit the packet when a response signal for the packet from the first wireless station is not received by a predetermined response time limit;
an acquiring unit configured to obtain from the first wireless station transmission prohibition period information indicating a transmission prohibition period for the first wireless station, during which transmission of a signal by the first wireless station is prohibited; and
a postponing unit configured to:
extend the predetermined response time limit that was to expire in the transmission prohibition period indicated by the acquired transmission prohibition period information such that the predetermined response time limit expires after the transmission prohibition period ends; and
transmit the packet to the first wireless station during the transmission prohibition period of the first wireless station, wherein extending the predetermined response time limit comprises extending a waiting period from the transmission of the packet until the extended predetermined response time limit expires.

2. The second wireless station according to claim 1, wherein the postponing unit is further configured to extend the predetermined response time limit if an ending of the transmission prohibition period of the first wireless station is later than the predetermined response time limit, and not extend the predetermined response time limit if the ending of the transmission prohibition period of the first wireless station is earlier than the predetermined response time limit.

3. The second wireless station according to claim 1, wherein the acquiring unit is further configured to obtain the transmission prohibition period information included in the packet transmitted by the first wireless station.

4. The second wireless station according to claim 3, wherein the acquiring unit is further configured to monitor a packet transmitted from the first wireless station to a wireless station other than the second wireless station and to obtain the transmission prohibition period information included in the monitored packet.

5. The second wireless station according to claim 1, wherein the transmission prohibition period information for the first wireless station is included in a header of a packet transmitted from the first wireless station.

6. A communication system comprising:
a first wireless station; and
a second wireless station wirelessly coupled to the first wireless station, wherein:
the first wireless station is configured to transmit to the second wireless station, a response signal for a packet received from the second wireless station, and to notify surrounding wireless stations of a transmission prohibition period of the first wireless station, during which transmission of a signal by the first wireless station is prohibited; and
the second wireless station is configured to:
when the response signal for the packet transmitted to the first wireless station is not received by a predetermined response time limit, retransmit the packet and extend the predetermined response time limit that is to expire in the transmission prohibition period of the first wireless station such that the predetermined response time limit expires after the transmission prohibition period ends; and transmit the packet to the first wireless station during the transmission prohibition period of the first wireless station, wherein extending the predetermined response time limit comprises extending a waiting period from the transmission of the packet until the extended predetermined response time limit expires.

7. The communication system according to claim 6, wherein the transmission prohibition period information for the first wireless station is included in a header of a packet transmitted from the first wireless station.

8. A communication method that is executed by a first wireless station that transmits to a second wireless station, a response signal for a packet received from the second wireless station, and that is executed by the second wireless station that when the response signal to the packet transmitted to the first wireless station is not received by a predetermined response time limit, retransmits the packet, the communication method comprising:

at the first wireless station, notifying surrounding wireless stations of a transmission prohibition period of the first wireless station, during which the transmission of a signal by the first wireless station is prohibited; and at the second wireless station, extending the predetermined response time limit that is to expire in the transmission prohibition period of the first wireless station, such that the predetermined response time lime expires after the transmission prohibition period ends, and transmitting the packet to the first wireless station during the transmission prohibition period of the first wireless station, wherein extending the predetermined response time limit comprises extending a waiting period from the transmission of the packet until the extended predetermined response time limit expires.

9. The communication method according to claim 8, further comprising:

at the second wireless station, obtaining from the first wireless station transmission prohibition period information indicating the transmission prohibition period for the first wireless station.

10. The communication method according to claim 8, wherein the transmission prohibition period information for the first wireless station is included in a header of a packet transmitted from the first wireless station.

* * * * *